United States Patent [19]

White et al.

[11] 4,424,990
[45] Jan. 10, 1984

[54] THERMOCHROMIC COMPOSITIONS

[75] Inventors: Lawrence J. White, San Jose; Tamar G. Gen, Palo Alto, both of Calif.

[73] Assignee: Raychem Corporation, Menlo Park, Calif.

[21] Appl. No.: 325,088

[22] Filed: Nov. 25, 1981

Related U.S. Application Data

[63] Continuation of Ser. No. 116,707, Jan. 30, 1980, abandoned.

[51] Int. Cl.$^3$ .................... C09D 5/26; G01K 11/14; G01K 11/16; F16L 47/00; F16L 9/14; F16L 21/00; F16L 55/00
[52] U.S. Cl. .................................... 285/381; 29/447; 29/450; 29/516; 29/526 R; 116/206; 116/207; 116/216; 138/99; 285/256; 285/417; 285/422; 374/141; 374/161; 374/162; 403/273; 403/278; 436/2; 436/147
[58] Field of Search .............. 252/408; 436/2, 147; 374/141, 162, 161; 116/206, 207, 216; 73/356; 23/230 R; 106/14.5; 285/381, 417, 256, 422; 403/273, 278; 138/99; 29/447, 526 R, 516, 450

[56] References Cited

U.S. PATENT DOCUMENTS

| | | | |
|---|---|---|---|
| 1,844,199 | 2/1932 | Bicknell et al. | 252/408 |
| 1,924,793 | 8/1933 | Laske | 252/408 |
| 3,002,385 | 10/1961 | Wahl et al. | 73/356 |
| 3,311,084 | 3/1967 | Edenbaum | 252/408 |
| 3,386,807 | 6/1968 | Edenbaum | 252/408 |
| 3,415,287 | 12/1968 | Heslop et al. | 285/381 |
| 3,471,422 | 10/1969 | Edlein et al. | 252/408 |
| 3,523,011 | 8/1970 | Bhiwahdaer et al. | 252/408 |
| 3,561,269 | 2/1971 | Seitz | 73/356 |
| 3,616,898 | 11/1971 | Massie | 252/408 |
| 3,744,295 | 11/1971 | Allinikov | 252/408 |
| 3,781,522 | 12/1973 | Borom et al. | 252/408 |
| 3,816,335 | 6/1974 | Evans | 252/408 |
| 3,980,581 | 9/1976 | Godsey, Jr. et al. | 252/408 |
| 4,105,583 | 8/1978 | Glover et al. | 252/408 |
| 4,135,553 | 1/1979 | Evans et al. | 285/381 |
| 4,135,743 | 1/1979 | Hughes | 285/381 |
| 4,144,104 | 3/1979 | Brooks | 75/157.5 |
| 4,146,392 | 3/1979 | Brooks | 75/161 |
| 4,151,748 | 5/1979 | Baum | 252/408 |
| 4,166,739 | 9/1979 | Brooks | 75/157.5 |

FOREIGN PATENT DOCUMENTS

| | | | |
|---|---|---|---|
| 50-121176 | 9/1975 | Japan | 252/408 |
| 478140 | 1/1938 | United Kingdom | 252/408 |
| 835786 | 5/1960 | United Kingdom | 252/408 |
| 1488393 | 10/1977 | United Kingdom | 285/381 |

OTHER PUBLICATIONS

C. A., vol. 71, p. 71, 125668w (1969).
C. A., vol. 85, p. 122, 126,001z (1976).
Cowling, J. E., et al., Ind. Eng. Chem., vol. 45, No. 10, pp. 2317–2320 (1953).
Hawkins, J., et al., Inorg. Chem., vol. 2, No. 4, pp. 843–849 (1963).
C. A., vol. 56, 13779h; 13780b (1962).
Day, J. H., Chem. Rev., vol. 68, No. 6, pp. 649–657 (1968).

Primary Examiner—Teddy S. Gron
Attorney, Agent, or Firm—Edith A. Rice; Herbert G. Burkard

[57] ABSTRACT

This invention provides novel thermochromic compositions which exhibit distinct color changes at temperatures in the range of about 165° C. to about 240° C. The compositions comprise basic copper carbonate and a sulfur compound. Paint formulations containing these novel thermochromic compositions or complexes of copper and sulfur-containing organic acids are also provided. The compositions are useful with heat-recoverable memory metal couplings to prevent overheating of the couplings during installation.

18 Claims, No Drawings

THERMOCHROMIC COMPOSITIONS

This is a continuation of application Ser. No. 116,707, filed Jan. 30, 1980, now abandoned.

BACKGROUND OF THE INVENTION

1. Field of the Invention

This invention relates to novel thermochromic compositions, novel thermochromic paint compositions and heat-recoverable memory metal devices coated on at least a portion of the exposed surface thereof with said thermochromic compositions.

2. Discussion of the Prior Art

Couplings and the devices comprising a heat-recoverable memory metal member or driver, a non-heat-recoverable insert, or liner, and a sealant are disclosed in copending U.S. application Ser. Nos. 1,372 filed Jan. 5, 1979 and 107,656 filed Dec. 27, 1979 by. E. S. Binkley, now abandoned, the disclosures of which are incorporated herein by reference. The sealant used in these patent applications comprises a thermosetting composition containing dispersed particulate fillers. In installing a heat-recoverable device of this type, heat is applied to cause the heat-recoverable member to recover, and the sealant to soften, flow, and then cure. In heating the device, it is important that the device and substrate to which it is being applied not be overheated. One method of monitoring the temperature of the device during the installation process is to apply a thermochromic paint to at least a portion of the exposed surface of the device. The use of a thermochromic paint to indicate the temperature of the sealant or adhesive is suggested in the above-mentioned applications.

It has been discovered that for a thermochromic paint to be useful in this context, it must undergo a distinct color change at a temperature in the range of from about 165° C. to about 240° C. The instant invention lies in the discovery of thermochromic compositions and thermochromic paint compositions which undergo a thermochromic transition in this range. The thermochromic compositions contain basic copper carbonate and a sulfur compound as hereinafter defined. These novel thermochromic compositions or complexes of copper with sulfur-containing organic acids dispersed in a paint formulation provide a means of conveniently monitoring the temperature of a coupling during installation.

The thermochromic properties of basic copper carbonate are known, and Day in "Chemical Reviews", Volume 68, Number 6, Nov. 25, 1968 reports that this compound changes from green to black at 320° C. Thus, this compound by itself in a thermochromic paint is entirely unsatisfactory for use with a heat-recoverable memory metal device as described herein.

The use of sulfur compounds with thermo-sensitive coloring materials is disclosed in U.S. Pat. No. 1,844,199. On page 4 of this patent, the use of copper nitrate with thiourea is disclosed. However, a thermochromic paint containing these two compounds has been found to have a thermochromic transition temperature of 110°–140° C. making such paint unsuitable for use with a memory metal device used in combination with a sealant or adhesive requiring heat to soften, flow and cure.

U.S. Pat. No. 1,924,793 discloses paints for indicating changes of temperature. These paints contain a metallic substance and a substance yielding a sulfur compound when heated, specifically thiourea or a substance yielding thiourea at elevated temperatures and selected from the group consisting of thiourea and rhodammonium. As discussed more fully below, thiourea is unsuitable for use in the novel thermochromic compositions of this invention.

U.S. Pat. No,. 3,616,898 uses temperature sensitive inks to indicate that a package to be heat-sealed has been subjected to temperatures adequate to accomplish heat-sealing of the packaging materials. The patent states that suitable temperature responsive inks may be formulated from lead oxide or lead carbonate or other compounds of multivalent metals such as cobalt, bismuth, cadmium or copper which change color in the presence of sulfur as a function of time and temperature. Such compounds can be mixed with sulfur or a sulfur-containing compound, such as a thiocarbanilide, and mixed in a vehicle or bonding agent, such as an alkyd resin varnish or ethyl cellulose, together with drying agents and anhydrous solvents. It is stated that the thermoresponsive ink is selected to have an activation temperature in the range of 320° F. to 450° F. (160° C. to 230° C.). No specific ink formulation is disclosed.

U.S. Pat. No.3,980,581 discloses thermally responsive compositions which are useful as temperature indicators because they undergo a change of state, specifically, melting followed by recrystallization, at a precise and predetermined temperature. The thermally responsive materials are solid solutions of organic compounds having analogous chemical structures, e.g. a solid solution of n-butyl sulfoxide and n-butyl sulfone. The addition of nucleating agents results in improvement in the rate of recrystallization. One of the nucleating agents disclosed is Azurite, which is further identified as "$Cu(CO_3)_2(OH)_2$".

SUMMARY OF THE INVENTION

This invention provides thermochromic compositions which exhibit a distinct change of color at temperatures in the range of from about 165° C. to about 240° C. The thermochromic composition comprises basic copper carbonate and a sulfur compound capable of effecting a distinct change of color of the copper compound at temperatures in the range of from about 165° C. to about 240° C.

Another aspect of this invention comprises a thermochromic paint composition which comprises a liquid thermochromic paint composition which comprises a liquid paint formulation having dispersed therein a thermochromic component selected from the group consisting of (a) mixtures of basic copper carbonate and a sulfur compound capable of effecting a distinct color change of the copper compound at temperatures in the range of from about 165° C. to about 240° C.; and (b) complexes of copper and sulfur-containing organic acids.

Yet another aspect of this invention comprises a coupling which comprises a hollow cylindrical heat-recoverable memory metal member, a liner inserted in said heat-recoverable member in intimate contact therewith, a sealant cooled on the interior surface of said liner and a thermochromic paint composition applied to at least a portion of the exposed surface of the coupling, said thermochromic paint composition comprising a liquid paint formulation having dispersed therein a thermochromic component selected from the group consisting of (a) mixtures of basic copper carbonate and a sulfur compound capable of effecting a distinct color change of the copper compound at temperatures in the range of from about 165° C. to about 240° C.; and (b) complexes of copper and sulfur-containing organic acids.

DETAILED DESCRIPTION OF THE INVENTION

Basic copper carbonate is a known compound and is generally designated by the formula $CuCO_3 \cdot Cu(OH)_2$. The compound is green in color and, as reported by Day in the article mentioned above, is known to change in color from green to black at 320° C. This change is at much too high a temperature for basic copper carbonate to be used by itself in a thermochromic paint for heat-recoverable memory metal devices.

The sulfur compound used in the novel thermochromic compositions of this invention can be any sulfur-containing compound which is capable of effecting a distinct change of color of the copper compound at temperatures between about 165° C. to about 240° C. Among sulfur compounds which can be used are inorganic sulfur compounds, elemental sulfur, and sulfur containing organic compounds such as thiols, thioethers, sulfur-containing organic acids, sulfoxides, sulfones, sulfonamides, and the like. Illustrative compounds which can be used include sodium sulfate, copper sulfate, free sulfur, dodecanethiol, sulfur-containing organic acids such as 3,3'-thiodipropionic acid, dimethyl sulfoxide, N-methyl-N-nitroso-p-toluene sulfonamide and the like.

The proportions of basic copper carbonate and the sulfur compound used in the composition are not critical. Sufficient sulfur compound should be present to produce a distinct color change in the desired range. Generally, this is achieved if the mole ratio of basic copper carbonate to sulfur compound is in the range of from about 0.5:1 to about 2:1, preferably from about 0.8:1 to 1.5:1. A mole ratio of 1:1 is particularly preferred.

Complexes of copper and sulfur-containing organic acids are discussed in the literature. For example, in *Chemical Abstracts* Volume 56:13779h and 56:13780b, studies in which the dissociation constants and stability constants of such complexes in aqueous solution are reported. It now has been found that complexes of copper and sulfur-containing organic acids undergo a thermochromic transition at temperatures in the range of from about 165° C. to about 240° C. Thus, paint formulations containing these complexes are useful with heat-recoverable memory metal couplings to prevent overheating during installation.

The complexes are prepared by reacting a source of copper (II) ions with sulfur containing organic acids. Preferred sulfur-containing organic acids are sulfur-containing aliphatic acids, in particular diacids. Suitable aliphatic diacids have the formula $S[(CH_2)_nCOOH]_2$ where n is 1 to 10, for example thiodipropionic acid or thiosuccinic acid. The source of copper (II) ion can be an inorganic salt of copper including for example, basic copper carbonate, copper nitrate, copper sulfate and the like. Copper salts of organic acids, e.g. copper acetate can also be used.

The thermochromic paint composition comprises the thermochromic component dispersed in a conventional liquid paint formulation. By the term "liquid paint formulation" is meant conventional solvent-binder systems used in preparing paints. Liquid paint formulations typically contain water or an organic solvent having dispersed or dissolved therein a polymeric or resin binder. Typical binders include natural resins such as kauri, copal, shellac, pontianak, dammar, sandarac and the like, and synthetic resins such as alkyd resins, nitrocellulose, phenolic resins, amino resins, polyvinyl acetate, polyvinyl alcohol, polyvinyl butyral, polyvinyl pyrrolidone, copolymers of vinyl accetate and vinyl chloride, methacrylate, polymers of methyl methacrylate and polymers of butyl acrylate, polymers and copolymers of ethylene, propylene, styrene, butadiene and isoprene, and the like.

Solvents which can be used include turpentine, aromatic hydrocarbons, such as benzene, toluene, and the xylenes, chlorinated hydrocarbons, such as trichloroethane, alcohols, such as ethanol and butanol, ketones, such as acetone, isobutyl ketone, methyl ethyl ketone, esters, such as ethyl acetate, and the like.

As stated above, the thermochromic compositions and thermochromic paint compositions of this invention can be used with a heat-recoverable memory metal coupling assembly which comprises a heat-recoverable member, a liner or insert and a sealant. Devices of this general type are described in the above-mentioned U.S. patent applications of E. S. Binkley. The heat-recoverable member of the assembly is typically of $\beta$-brass as disclosed for example in copending U.S. Pat. Nos. 4,144,104, 4,146,392, and 4,166,739, the disclosures of which are incorporated herein by reference. Heat-recoverable members of other heat-recoverable metals, such as alloys based on nickel and titanium, can also be used.

Composite couplings of this general type comprising a heat-recoverable driver and a non-heat-recoverable liner or insert are described in British Pat. No. 1,488,393, assigned to Raychem Corporation, the disclosure of which is incorporated herein by reference. The liner used in the coupling assembly is preferably of a metal. Metals frequently used in this type of liner are aluminum or copper. Other non-heat-recoverable materials can also be used. The liner is inserted in the heat-recoverable driver by techniques known in the art, for example as described in the above-mentioned British Patent. For many uses of such a composite coupling, the liner is longer than the heat-recoverable member and ends of the liner visible extend beyond the ends of the driver.

It has been found that in certain applications of composite couplings of this type, it is desirable to coat the interior surface of the liner with a sealant. As described in the above patent applications of Binkley, the sealant can be provided with a particulate filler such as quartz. For some uses such a filler is not required and sealant alone is applied to the interior surface of the liner. In installing a coupling of this type it is necessary to apply heat to cause the heat-recoverable member to recover and to cause the adhesive to soften, flow, and then cure. This results in a fluid tight joint.

Sealants which can be used include thermosetting polymeric compositions. Preferably the sealant is an adhesive, preferably an adhesive which is solid and tack-free at 25° C. and which softens, flows, and cures on application of heat. Epoxy resin adhesives are particularly preferred. Suitable curable epoxy resins include resins which comprise 5 to 95 parts by weight of an epoxy resin, having an epoxy equivalent weight of 100 to 5,000, preferably 600 to 800, e.g. a bisphenol A epoxy resin, 5 to 95 parts by weight of an epoxy resin with at least 4 functional sites, e.g. a cresol-novolac resin having an epoxy equivalent weight of 200 to 500; and a substantially stoichiometric amount of a curing agent, e.g. a phenolic resin preferably a bisphenol A polymer with a molecular weight of about 500, an anhydride, an amine or an amide. In order to improve the flexibility of the epoxy resin composition after curing, the composition may contain a small amount, e.g. 5 to 20% by weight of a carboxy-terminated butadiene-nitrile rubber which will react with the epoxide resin to give a crosslinkable graft copolymer resin. The rubber preferably has a molecular weight of 3,000 to 4,000, e.g. about 3,500, a percent nitrile content of 10 to 27%, e.g. about 18% and a carboxyl functionality of 1.5 to 3 per molecule, e.g. about 2 per molecule.

A heat-recoverable coupling as just described has been found to be particularly useful for joining thin walled pipes, in particular pipes used in refrigeration and air-conditioning equipment. As discussed above, if excessive heat is applied to the coupling during installation, failure and/or leakage of the installed coupling may result. This problem has been particularly pronounced when the pipes being joined and/or the liner are of aluminum and to a lesser extent if of copper or some other metal. It has been found that if the liner and/or pipes are of aluminum, the heat applied during installation of the coupling should be controlled so that the temperature of the coupling will not rise above about 300°–400° C.

While not wishing to be bound by any theory, it is believed that if subsequent failure and/or leakage of the coupling occurs because of overheating during installation, it is due to relaxation of the aluminum (or other metal) liner or pipes of degradation of the sealant or both. Generally, it has been found that relaxation of the aluminum occurs at a lower temperature than degradation of commonly used sealants. Relaxation of the aluminum (or similar metal) is thought to be due to the following factors. When heat is applied to the coupling the sealant softens, the heat-recoverable member or driver recovers and the sealant flows. To effect cure of the sealant, additional heat is applied. This additional heat causes the heat-recovered member, the liner and the pipes or tubes being coupled, to expand according to their respective coefficients of thermal expansion. When the heat-recovered driver has a coefficient of thermal expansion that is less than that of the liner and/or pipes (as will be the case when the driver is of β-brass and the liner and/or pipes are aluminum), there will be a significant increase in the level of stress at the interface between the driver and liner, or liner and pipes, or both. This increase in stress level results from the constrainment of the inner members (i.e. liner and pipes) by the less expansible driver. In order to relieve this stress, the aluminum (or similar metal) may elongate axially or yield radially. This relaxation or elongation of the aluminum is possible because the yield strength of aluminum at these temperatures is extremely low. Other factors that may cause failure or leakage are degradation of the sealant, and inadequate cure of the sealant. While it is important to avoid overheating of the coupling, it is equally important that sufficient heat must be applied to effect cure of the sealant. Inadequate cure of the sealant may cause the pipes to leak and may also render the sealant susceptible to attack by solvents, which in many applications will be the fluid flowing through the pipes joined by the coupling.

When couplings of this type are installed in the field, heat can most readily be applied by means of a propane torch. Other appropriate sources of heat can be used, as will be readily apparent to one skilled in the art. When a propane torch is used, heat generated by the torch is sufficient to cause the temperature of the coupling to rise at a rate of about 600°–900° C. per minute. The novel thermochromic compositions of this invention change color in the range of from about 165° C. to about 240° C. It has been found that if at least a portion of the coupling assembly is coated with one of these compositions and heating of the coupling is discontinued within about 10 seconds after the thermochromic change, over-heating of the coupling will be avoided. Also, since the thermochromic transition occurs in the range of from about 165° C. to 240° C., adequate heat will have been provided to effect cure of the sealant.

EXAMPLE 1

A simple test method that can readily be conducted to determine whether a particular sulfur compound is suitable for use in the thermochromic compositions of this invention has been devised. In this test, basic copper carbonate and the sulfur compound to be tested are dispersed in a liquid paint formulation. The paint formulation consists of an ethylene-vinyl acetate copolymer binder in a 1,1,1-trichloroethane and tetrachloroethylene solvent system. The paint is brushed onto a round glass cover slide 0.725 inch in diameter and 0.008 inch thick. The slide is allowed to dry for about 5–10 minutes. The slide is then placed on the heater platen of a Fisher-Johns Melting Point Apparatus. Heat is applied at a rate of 30° C. per minute. The temperature at which the paint changes color is recorded. This test was conducted for several sulfur compounds with the results given in Table I.

TABLE I

Temperature of Color Change

| Sulfur Compound | Observed Color Change* | Temperature of Color Change |
|---|---|---|
| None | dark brown/black | 310° C. |
| Na$_2$SO$_4$ | yellow green | 215° C. |
|  | brown-green | 240° C. |
|  | medium brown | 260° C. |
| CuSO$_4$ | light brown | 255° C. |
|  | medium dark brown | 270° C. |
| 3,3'-thiodipropionic acid** | medium brown | 215° C. |
|  | dark brown/black | 235° C. |
| Free Sulfur | dark green | 175° C. |
|  | grey green | 195° C. |
|  | dark brown | 220° C. |
| Thiourea | turned brown on mixing at room temperature |  |
| dodecanethiol | yellow green | 110° C. |
|  | yellow | 185° C. |
|  | dark brown | 240° C. |
| dimethyl sulfoxide | yellow | 205° C. |
|  | dark brown | 275° C. |
| 4,4'-sulfonyldiphenol | yellow green | 195° C. |
|  | dark brown | 240° C. |
| N—methyl-N—nitroso-p-toluene sulfonamide | yellow green | 185° C. |
|  | dark brown | 285° C. |
| dilauryl thiodipropionate | yellow green | 215° C. |
|  | yellow | 240° C. |
|  | dark brown | 280° C. |

*In each case the starting color was light green, except with 3,3'-thiodipropionic acid where the color of the paint was blue-green.
**A complex of copper and 3,3'-thiodipropionic acid was formed.

The results shown in Table I indicate that the combination of basic copper carbonate and sulfur compounds results in thermochromic compositions which undergo at least one color change in the range of 165°–240° C., the exceptions being thiourea and copper sulfate. 3,3'-Thiodipropionic acid and dodecanethiol each exhibited a particularly distinct color change in the appropriate temperature range. The remaining sulfur compounds effected a less distinct color change of the copper compound within the range of 165°–240° C. and are therefore less desirable temperature indicators for this coupling system.

EXAMPLE 2

To test thermochromic compositions for use with a heat-recoverable coupling the following test procedure was employed. In this test, a coupling of internal diameter of ⅜ inch was used with a liner of somewhat greater length than the driver. The coupling comprised a heat-recoverable driver of β-brass, a liner of aluminum and an epoxy sealant comprising:

|  | Parts by weight |
|---|---|
| Bisphenol A epoxy resin of epoxy equivalent weight about 750 ("Epon 2001") | 38.00 |
| Multifunctional epoxy cresol novolac resin of epoxy equivalent weight about 230 ("ECN 1280") | 4.25 |
| Bisphenol A polymer curing agent of molecular weight about 500 ("XD 8062.01") | 17.75 |
| Quartz particles ("P Quartz") | 20.00 |
| $TiO_2$ | 19.5 |
| Carbon Black (Statex 160) | 0.5 |

The thermochromic component to be tested was incorporated into a paint formulation as described in Example 1. The paint was coated on the exposed outer surface of the liner which extended beyond the heat-recoverable driver. The coupling was placed in the flame of a propane torch, positioned such that the tip of the inner blue cone just touched the coupling. The time taken to produce the color change of the thermochromic paint was recorded. It was determined that if heat is being applied at a rate of 600°–750° C. per minute, overheating of the coupling will be prevented if heating is discontinued within 21 to 35 seconds. At the same time, there is sufficient heat to cure the epoxy. In general, at the rate of heating encountered when using this propane torch, it is preferred that the color change of the thermochromic paint provide a 10 second leeway for removal of the torch. Thus, in these tests a color change within less than 25 seconds is desirable. Also, if the color change takes place in less than about 21 seconds, incomplete curing of the epoxy is likely to occur.

The results of these tests are shown in Table II.

TABLE II

Coupling Installation with Thermochromic Paint Containing $CuCO_3.Cu(OH)_2$ + S-cpd.

| Test Sample | S-Cpd in Paint | Time to Color Change(sec.) |
|---|---|---|
| 1 | $Na_2SO_4$ | 30 |
| 2 | $CuSO_4$ | 33 |
| 3 | Thiodipropionic acid* | 23 |
| 4 | Free sulfur | 19 |
| 5 | Dodecanethiol** | 25 |
| 6 | Dimethyl sulfoxide | 27 |
| 7 | 4,4'-Sulfonyldiphenol*** | 25 |
| 8 | N—methyl-N—nitroso-p-toluene sulfonamide | 30 |

*A complex of copper and 3,3'-thiodipropionic acid was formed.
**The paint caught fire during the test.
***This compound gave off gas causing the paint to bubble.

Using the test procedures described in detail above, one skilled in the art will be able, without undue experimentation, to determine suitable sulfur compounds for use with basic copper carbonate to produce the thermochromic compositions of this invention.

While the thermochromic compositions of this invention can be used with heat-recoverable memory metal couplings as described in detail above, the compositions can be used whenever it is desired to know that a given object or article is at a temperature in the range of 165° C. to 240° C. For most uses, the thermochromic compositions will be incorporated into a paint formulation.

What is claimed is:

1. A thermochromic composition comprising a mixture of basic copper carbonate and a sulfur-containing organic acid; said composition undergoing a distinct change of color at temperatures in the range of from about 165° C. to about 240° C.

2. A composition in accordance with claim 1 wherein said sulfur-containing organic acid is a sulfur-containing organic diacid.

3. A composition in accordance with claim 2 wherein said sulfur-containing organic diacid is a sulfur containing aliphatic diacid.

4. A composition in accordance with claim 3 wherein said sulfur-containing aliphatic diacid is 3,3'-thiodipropionic acid.

5. A thermochromic composition in accordance with claim 1 wherein the mole ratio of said basic copper carbonate to said sulfur-containing organic acid is from about 0.5:1 to about 2:1.

6. A composition in accordance with claim 5 wherein said mole ratio is 1:1.

7. A composition in accordance with claim 1 wherein said distinct change of color occurs at temperatures in the range of from about 190° C. to about 240° C.

8. A thermochromic paint composition comprising a liquid paint formulation having dispersed therein a thermochromic component comprising a complex of copper and a sulfur-containing organic acid.

9. A paint composition in accordance with claim 8 wherein said sulfur-containing organic acid is a sulfur-containing aliphatic acid.

10. A paint composition in accordance with claim 8 wherein said thermochromic component is a complex of copper and 3,3'-thiodipropionic acid.

11. A paint composition in accordance with claim 10 wherein said complex is formed by reacting basic copper carbonate and 3,3'-thiodipropionic acid.

12. A paint composition in accordance with claim 8 wherein said liquid paint formulation comprises an organic solvent having binder dissolved or dispersed therein.

13. A paint composition in accordance with claim 12 wherein said binder is an ethylene-vinyl acetate copolymer.

14. A coupling which comprises a hollow cylindrical heat-recoverable memory metal member, a liner inserted in said heat-recoverable member in intimate contact therewith, a sealant coated on the interior surface of said liner and a thermochromic paint composition applied to at least a portion of the exposed surface of the coupling, said thermochromic paint composition comprising a liquid paint formulation having dispersed therein a thermochromic component comprising a complex of copper and a sulfur-containing organic acid.

15. A coupling in accordance with claim 14 wherein said thermochromic paint composition comprises a liquid paint formulation having dispersed therein a complex of copper and a sulfur-containing organic diacid.

16. A coupling in accordance with claim 15 wherein said complex is a complex of copper and 3,3'-thiodipropionic acid.

17. A coupling in accordance with claim 16 wherein said complex is formed by reacting basic copper carbonate and 3,3'-thiodipropionic acid.

18. A coupling in accordance with claim 14 wherein said heat-recoverable memory metal member is of β-brass, said liner is of aluminum, said sealant is an epoxy resin, and said thermochromic paint composition comprises a liquid paint formulation having dispersed therein a complex of copper and 3,3'-thiodipropionic acid.

* * * * *